United States Patent
Lee et al.

(10) Patent No.: US 11,157,403 B2
(45) Date of Patent: Oct. 26, 2021

(54) CONTROLLER AND MEMORY SYSTEM FOR RECEIVING A FORMAT REQUEST AND CONFIGURING A MAP TABLE

(71) Applicant: SK hynix Inc., Gyeonggi-do (KR)

(72) Inventors: Joo Young Lee, Seoul (KR); Ki Duck Kim, Gyeonggi-do (KR); Jea Young Zhang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 12 days.

(21) Appl. No.: 16/522,197

(22) Filed: Jul. 25, 2019

(65) Prior Publication Data

US 2020/0183832 A1 Jun. 11, 2020

(30) Foreign Application Priority Data

Dec. 7, 2018 (KR) .................. 10-2018-0157453

(51) Int. Cl.
*G06F 12/02* (2006.01)
*G06F 3/06* (2006.01)

(52) U.S. Cl.
CPC ........ *G06F 12/0292* (2013.01); *G06F 3/0661* (2013.01); *G06F 3/0679* (2013.01); *G06F 12/0246* (2013.01); *G06F 2212/7201* (2013.01)

(58) Field of Classification Search
CPC .................. G06F 9/45558; G06F 11/1458
See application file for complete search history.

(56) References Cited

U.S. PATENT DOCUMENTS

| 6,587,915 | B1 * | 7/2003 | Kim ................ G06F 12/0246 365/185.33 |
| 10,545,808 | B2 * | 1/2020 | Zhou ................... G06F 3/061 |
| 2014/0337560 | A1 * | 11/2014 | Chun .............. G06F 12/0246 711/103 |
| 2018/0101477 | A1 * | 4/2018 | Kan .................. G06F 12/0246 |
| 2020/0004701 | A1 * | 1/2020 | Subbarao ............. G06F 3/0656 |

FOREIGN PATENT DOCUMENTS

| KR | 10-1650427 | 9/2016 |
| KR | 10-1759811 | 7/2017 |

* cited by examiner

*Primary Examiner* — Charles Rones
*Assistant Examiner* — Ryan Dare
(74) *Attorney, Agent, or Firm* — IP & T Group LLP (57) ABSTRACT

There are provided a controller, a memory system having the same, and an operating method thereof. The controller includes: a host interface configured to receive a format request from a host, and output an internal format request including initial logical unit information; and a flash translation layer configured to initialize a map table for storing information on mapping between logical and physical unit numbers according to the initial logical unit information.

12 Claims, 6 Drawing Sheets

| LU-ID | Power | Start ADD | END address |
|-------|-------|-----------|-------------|
| 1 | P1 | SA1 | EA1 |
| 2 | P1 | SA2 | EA2 |
| 3 | P2 | SA3 | EA3 |
| 4 | P1 | SA4 | EA4 |
| 5 | P2 | SA5 | EA5 |
| 6 | P3 | SA6 | EA6 |
| ... | ... | ... | ... |

| CMT | |
|---|---|
| LUN | PUN |
| L1 | MD3 |
| L2 | MD6 |
| L3 | MD1 |
| L4 | MD4 |
| L5 | MD2 |
| L6 | MD5 |
| ... | ... |

| INT | |
|---|---|
| LUN | PUN |
| L1 | null |
| L2 | null |
| L3 | null |
| L4 | null |
| L5 | null |
| L6 | null |
| ... | ... |

CONTROLLER AND MEMORY SYSTEM FOR RECEIVING A FORMAT REQUEST AND CONFIGURING A MAP TABLE

CROSS-REFERENCE TO RELATED APPLICATION

The present application claims priority under 35 U.S.C. § 119(a) to Korean patent application number 10-2018-0157453 filed on Dec. 7, 2018, the entire disclosure of which is incorporated herein by reference in its entirety.

BACKGROUND

Field of Invention

Various embodiments of the present disclosure generally relate to a controller, a memory system having the same, and an operating method thereof. More particularly, the embodiments relate to a controller capable of performing an overall format operation of a storage device, a memory system having the controller, and an operating method of the memory system.

Description of Related Art

A memory system may include a storage device and a controller.

The storage device may store data or output stored data. For example, the storage device may be configured as a volatile storage device in which stored data disappears when the supply of power is interrupted, or be configured as a nonvolatile storage device in which stored data is retained even when the supply of power is interrupted.

The controller may control data communication between a host and the storage device. When the storage device is configured as a non-volatile flash storage device, the controller may include a Flash Translation Layer (FTL) so as to communicate between the storage device and the host.

The host may communicate with the storage device through the controller by using an interface protocol, such as Peripheral Component Interconnect-Express (PCI-e or PCIe), Advanced Technology Attachment (ATA), Serial ATA (SATA), Parallel ATA (PATA), or Serial Attached SCSI (SAS). Interface protocols between the host and the memory system are not limited to the above-described examples, and may include various interfaces such as a Universal Serial Bus (USB), a Multi-Media Card (MMC), an Enhanced Small Disk Interface (ESDI), and Integrated Drive Electronics (IDE).

SUMMARY

Embodiments provide a controller configured to omit a map table update when an overall format operation is performed, a memory system having the controller, and an operating method of the memory system.

According to an aspect of the present disclosure, there is provided a controller including: a host interface configured to receive a format request from a host, and output an internal format request including initial logical unit information; and a flash translation layer configured to initialize a map table for storing information on mapping between logical and physical unit numbers according to the initial logical unit information.

According to another aspect of the present disclosure, there is provided a memory system including: a storage device configured to store data; and a controller configured to control the storage device in response to a request of a host, wherein, when a format request is received from the host, the controller initializes a map table stored in a flash translation layer, the map table storing information on mapping between logical and physical unit numbers, and transmits a format command to the storage device.

According to still another aspect of the present disclosure, there is provided a method for operating a memory system, the method including: outputting an internal format request including initial logical unit information, when a format request is received from a host; initializing a map table storing information on mapping between logical and physical unit numbers according to the initial logical unit information; generating a format command in response to the internal format request; and transmitting the format command to a storage device.

According to another aspect of the present disclosure, there is provided a memory system including: a memory device including a region for storing system data; and a controller suitable for controlling the memory device, wherein the controller includes: a host interface including a logical unit configuration register storing logical unit information, and suitable for receiving a format request from a host and outputting an internal format request including the logical unit information; a map table suitable for storing mapping information on mapping between logical addresses and physical addresses; and a flash translation layer suitable for receiving the internal format request, and initializing the map table based on the logical unit information.

BRIEF DESCRIPTION OF THE DRAWINGS

Various embodiments will now be described more fully hereinafter with reference to the accompanying drawings; however, features and aspects of the present invention may be configured or arranged differently than disclosed herein. Thus, the present invention is not limited to the embodiments set forth herein. Rather, these embodiments are provided so that this disclosure is thorough and complete and fully conveys the scope of the invention to those skilled in the art. It is further noted that, throughout the specification, reference to "an embodiment," "another embodiment" or the like is not necessarily to only one embodiment, and different references to any such phrase are not necessarily to the same embodiment(s).

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

In the present disclosure, advantages, features and methods for achieving them will become more apparent after a reading of the following description taken in conjunction with the drawings. The present invention may, however, be embodied in different forms, which may be modifications or variations of any of the disclosed embodiments. Thus, the present invention is not limited to the embodiments set forth herein. Rather, these embodiments are provided to describe the present invention in detail to the extent that those skilled in the art to which the disclosure pertains may easily practice the present invention.

It is noted that reference to "an embodiment," "another embodiment" or the like does not necessarily mean only one embodiment, and different references to any such phrase are not necessarily to the same embodiment(s).

Throughout the specification, when an element is referred to as being "connected" or "coupled" to another element, it can be directly connected or coupled to another element or be indirectly connected or coupled to the another element with one or more intervening elements interposed therebetween. In addition, when an element is referred to as "including" a component, this indicates that the element may further include one or more additional components, instead of excluding such additional component(s), unless the context indicates otherwise.

As used herein, singular forms may include the plural forms as well and vice versa, unless the context clearly indicates otherwise. The articles 'a' and 'an' as used in this application and the appended claims should generally be construed to mean 'one or more' unless specified otherwise or clear from context to be directed to a singular form.

Figure 1:
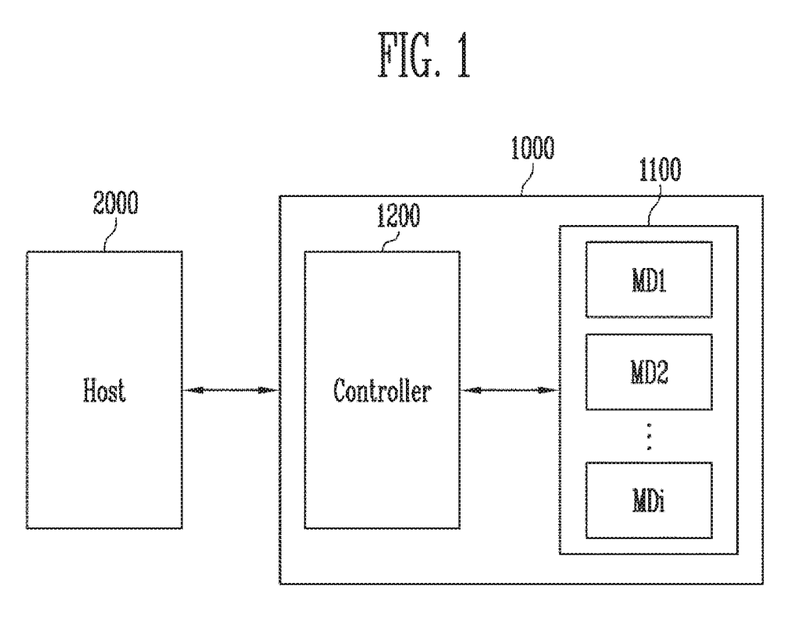
FIG. 1 is a diagram illustrating a memory system according to an embodiment of the present disclosure.

FIG. 1 is a diagram illustrating a memory system 1000 according to an embodiment of the present disclosure.

Referring to FIG. 1, the memory system 1000 may include a storage device 1100 for storing data and a controller 1200 for controlling the storage device 1100. The memory system 1000 may further include a buffer memory in addition to the above-described components. In this embodiment, the memory system 1000 may be a Universal Flash Storage (UFS) card. In addition, the memory system 1000 may be configured with various systems.

The host 2000 may communicate with the memory system 1000, using at least one of various communication schemes, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a nonvolatile memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The storage device 1100 may include a plurality of memory devices MD1 to MDi (where i is a positive integer). The memory devices MD1 to MDi may be implemented with a volatile storage device in which stored data disappears when the supply of power is interrupted or a nonvolatile storage device in which store data is retained even when the supply of power is interrupted. In this embodiment, a case where the memory devices MD1 to MDi are implemented with a flash memory device, which is a kind of nonvolatile storage device, is described as an example.

The controller 1200 may control overall operations of the memory system 1000, and control data exchange between the host 2000 and the storage device 1100. The controller 1200 may be coupled to the storage device 1100 through a channel, and transmit a command, an address, and data through the channel. For example, the controller 1200 may generate a command in response to a request received from the host 2000, and output the generated command to the storage device 1100.

For example, the controller 1200 may generate an internal request in response to a request received from the host 2000, and generate a command in response to the internal request. In various embodiments, when the controller 1200 receives a format request from the host 2000, the controller 1200 may omit an unmap operation of re-storing an address mapping table indicating a mapping relation between logical addresses and physical addresses, and initialize the address mapping table. Also, the controller 1200 may output or transmit a format command to the storage device 1100. In response to the format command, the storage device 1100 may delete system data of the memory devices MD1 to MDi.

Figure 2:
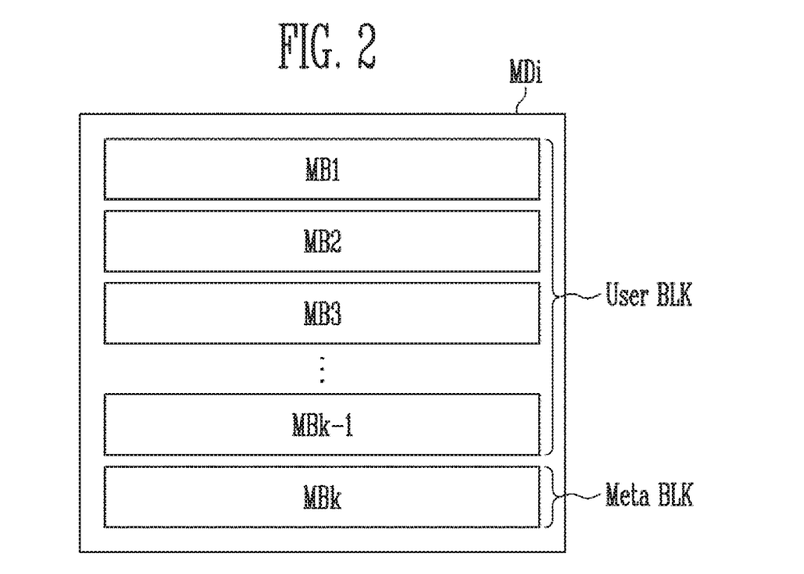
FIG. 2 is a diagram illustrating a memory device, such as that shown in FIG. 1.

FIG. 2 is a diagram illustrating an example of the memory device MDi shown in FIG. 1.

Referring to FIG. 2, first to ith memory devices MD1 to MDi shown in FIG. 1 are configured identical to one another, and therefore, one such representative memory device MDi is described as an example.

The memory device MDi may include a plurality of memory blocks MB1 to MBk (where k is a positive integer) for storing data. For example, first to kth memory blocks MB1 to MBk may be included in the memory device MDi.

Each of the memory blocks MB1 to MBk includes a plurality of memory cells for storing data. Each of the memory cells may be implemented as a nonvolatile memory cell, and be configured in a two-dimensional structure in which the memory cells are arranged in parallel to a substrate or a three-dimensional structure in which the memory cells are stacked vertically to a substrate.

The memory blocks MB1 to MBk may be divided into a plurality of user blocks (User BLK) and at least one meta block (Meta BLK) according to their usages.

Program data used by a user may be stored in the user blocks, and system data used in the memory system 1000 may be stored in the meta block. For example, the system data may include address mapping information, debugging information, and offset information of various operations. The system data may be stored in the meta block by a program operation, and be erased by an erase operation or read by a read operation, under the control of the controller 1200 of FIG. 1. In addition, access of the user to the meta block is blocked, and the meta block may be managed in accordance with a policy in which high reliability and security is applied to the meta block as compared with the user blocks.

Figure 3:
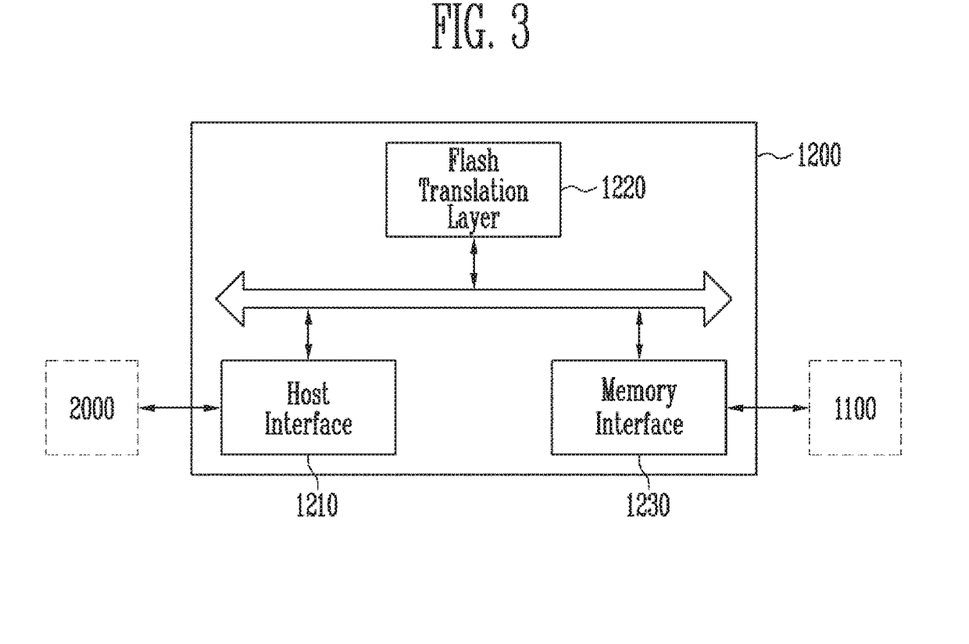
FIG. 3 is a diagram illustrating in detail a controller, such as that shown in FIG. 1.

FIG. 3 is a diagram illustrating in detail an example of the controller shown in FIG. 1.

Referring to FIG. 3, the controller 1200 may include a host interface 1210, a flash translation layer 1220, and a memory interface 1230.

The host interface 1210 may transmit a request, an address, and data received from the host 2000 to the flash translation layer 1220 according to a protocol. Also, when a format request is received, the host interface 1210 may transmit an internal request including initial logical unit information to the flash translation layer 1220. The logical unit information stored in the host interface 1210 remains fixed, that is, such information is not altered, and may include information related to an operation on each logical unit.

When the storage device 1100 includes a flash memory device, the flash translation layer 1220 may translate a logical address with respect to the host 2000 into a physical address with respect to the storage device 1100. Conversely, the flash translation layer 1220 may translate the physical address into the logical address. Therefore, the flash translation layer 1220 may include a map table for mapping between logical addresses and physical addresses, and manage the map table. In addition, the flash translation layer 1220 may perform functions such as garbage collection and wear leveling so as to efficiently manage the storage device 1100. The garbage collection and wear leveling are known in the art, and therefore, detailed description thereof is omitted.

According to this embodiment, in a format operation, the flash translation layer 1220 may initialize only the map table without performing an unmap operation of releasing mapping between logical and physical addresses in the map table. For example, when the flash translation layer 1220 receives an internal format request including logical unit information from the host interface 1210, the flash translation layer 1220 may initialize the map table, based on the logical unit information.

The memory interface 1230 may transmit and receive a command, an address, and data between the flash translation layer 1220 and the storage device 1100.

Figure 4:
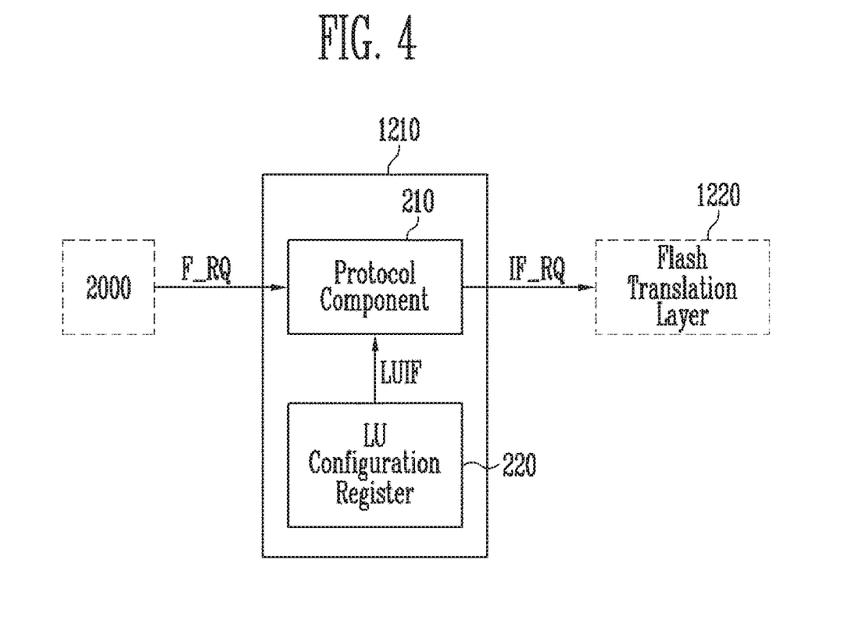
FIG. 4 is a diagram illustrating in detail a host interface, such as that shown in FIG. 3.

FIG. 4 is a diagram illustrating in detail an example of the host interface 1210 shown in FIG. 3.

Referring to FIG. 4, the host interface 1210 may include a protocol component 210 and a logical unit (LU) configuration register 220.

The protocol component 210 may transmit data between the host 2000 and the flash translation layer 1220 according to a set protocol. For example, when the protocol component 210 receives a format request F_RQ from the host 2000, the protocol component 210 may receive logical unit information LUIF from the LU configuration register 220, and output an internal format request IF_RQ including the logical unit information LUIF.

The LU configuration register 220 may store information on initial setting values of the controller 1200. For example, the LU configuration register 220 may include logical unit information LUIF including various setting values of a logical address with respect to the host 2000.

Figure 5:
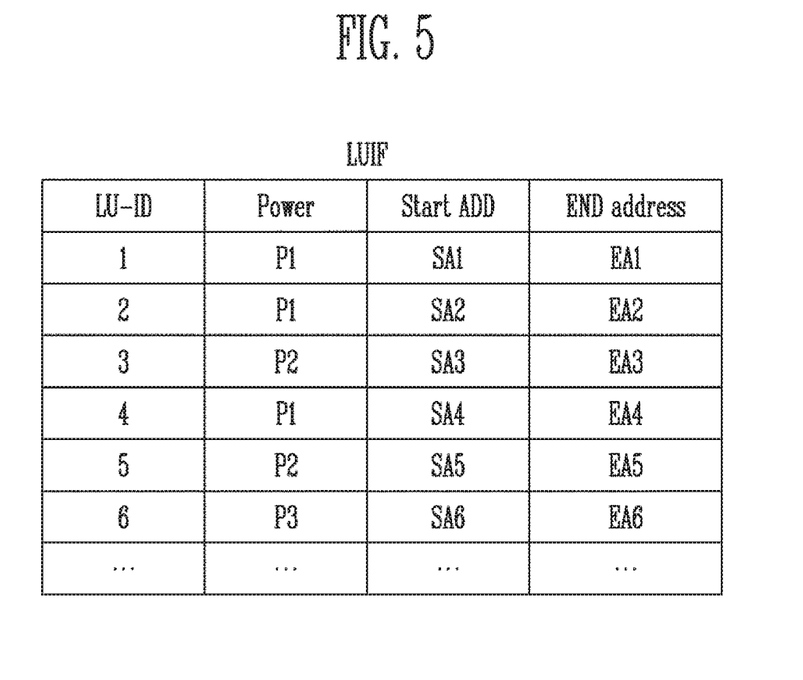
FIG. 5 is a diagram illustrating logical unit information according to an embodiment of the present disclosure.

FIG. 5 is a diagram illustrating logical unit information LUIF according to an embodiment of the present disclosure.

Referring to FIG. 5, the logical unit information LUIF may include various setting values according to a logical unit. The logical unit information LUIF may include information on power (Power), start address (Start ADD), and end address (END address) of each logical unit, distinguished by identification LU-ID. For example, information for a first logical unit ID1 may be stored and indicate that the power (Power) is set to a first power value P1, the start address (Start ADD) is a first start address SA1, and the end address (END address) is a first end address EA1. Similarly, such information for logical units ID2 to ID6 may be stored.

The information for each of the logical units ID1 to ID6 is not changed even when the memory system 1000 is changed, and may be maintained as an initially set value.

Figure 6:
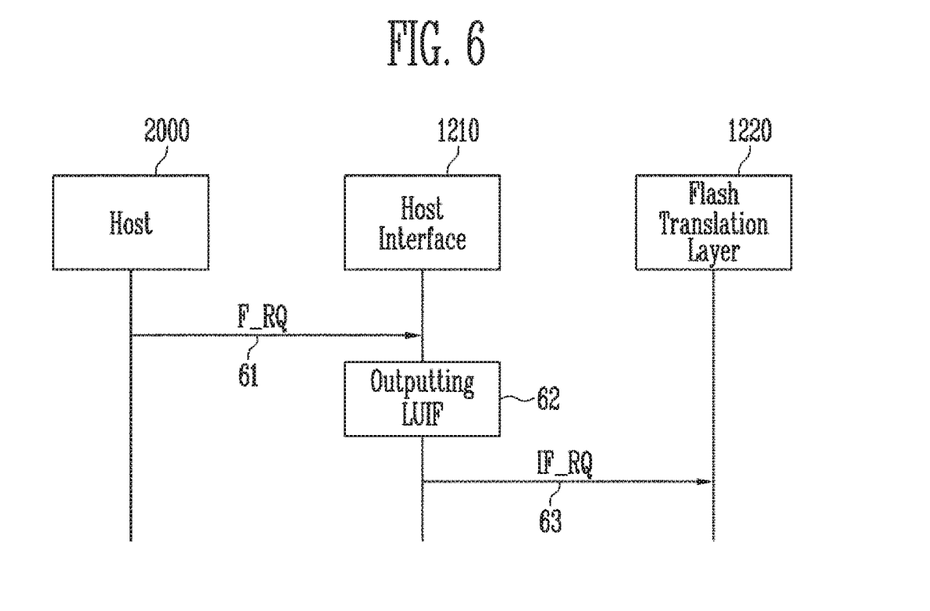
FIG. 6 is a diagram illustrating an operating method of a memory system according to an embodiment of the present disclosure.

FIG. 6 is a diagram illustrating an operating method of a memory system, e.g., the memory system 1000 of FIG. 1, according to the present disclosure.

Referring to FIG. 6, when a format request F_RQ is received from the host 2000 so as to perform a format operation of the memory system 1000 (61), the host interface 1210 may internally output logical unit information LUIF in response to the format request F_RQ (62). Subsequently, the host interface 1210 may output, to the flash translation layer 1220, an internal format request IF_RQ including the logical unit information LUIF (63).

The flash translation layer 1220 initializes a map table in response to the internal format request IF_RQ.

Figure 7:
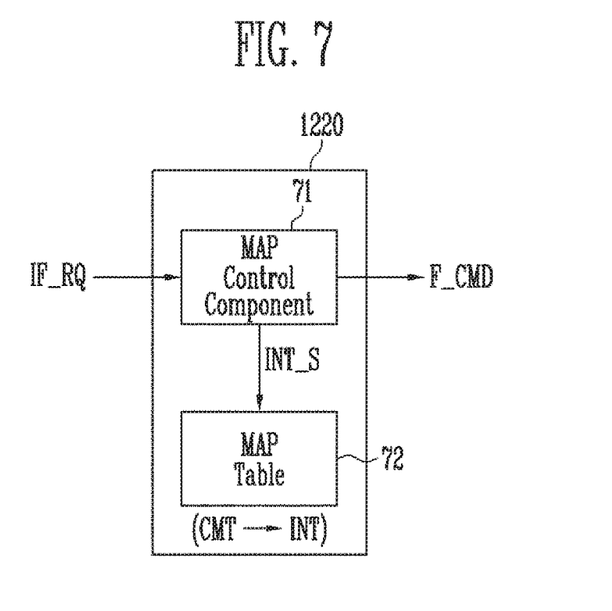
FIG. 7 is a diagram illustrating in detail a flash translation layer, such as that shown in FIG. 3.

FIG. 7 is a diagram illustrating a flash translation layer, e.g., the flash translation layer 1220 shown in FIG. 3, according to an embodiment of the present disclosure.

Referring to FIG. 7, the flash translation layer 1220 may include a map control component 71 and a map table 72. Although it is illustrated that the flash translation layer 1220 includes the map table 72, the map table 72 may be implemented with a buffer memory (not shown) within the controller 1200 of FIG. 1.

When an internal format request IF_RQ is received from the host interface 1210 of FIG. 4, the map control component 71 may output an initialization signal INT_S and a format command F_CMD according to logical unit information LUIF included in the internal format request IF_RQ. The initialization signal INT_S may be transmitted to the map table 72, and the format command F_CMD may be transmitted to the storage device 1100. In response to the format command F_CMD, the storage device 1100 may delete system data (e.g., mapping data or information) stored in a certain region, for example, a meta block (Meta BLK) of the memory device MDi as shown in FIG. 2.

The map table 72 may store address mapping information indicating a mapping relation between logical and physical addresses, and such address mapping information may be frequently varied by an operation of the memory system 1000. For example, a free block of the storage device 1100 is used whenever a program operation is performed, and therefore, the address mapping information may be frequently updated. In addition, in an erase operation, a memory block in which data is stored becomes the free block, and therefore, the address mapping information may be updated by an unmap operation on a corresponding physical block. When the address mapping information is varied as described above, an update operation of the map table is performed, and the varied address mapping information is stored even in a meta block of the storage device 1100. Therefore, the operation time of the memory system 1000 may be increased.

In this embodiment, in a format operation, the map table is initialized in response to the initialization signal INT_S, instead of omitting the unmap operation on the map table. That is, a current map table CMT is initialized to an initial map table INT.

As described above, when the format operation is performed, user blocks of the storage device 1100 are all formatted, and thus mapping information between logical and physical addresses, which is stored in the existing map table, is unnecessary. Accordingly, an operation of updating address mapping information is unnecessary and thus omitted, and the map table is initialized, so that the format operation time of the memory system 1000 may be reduced.

Figure 8:
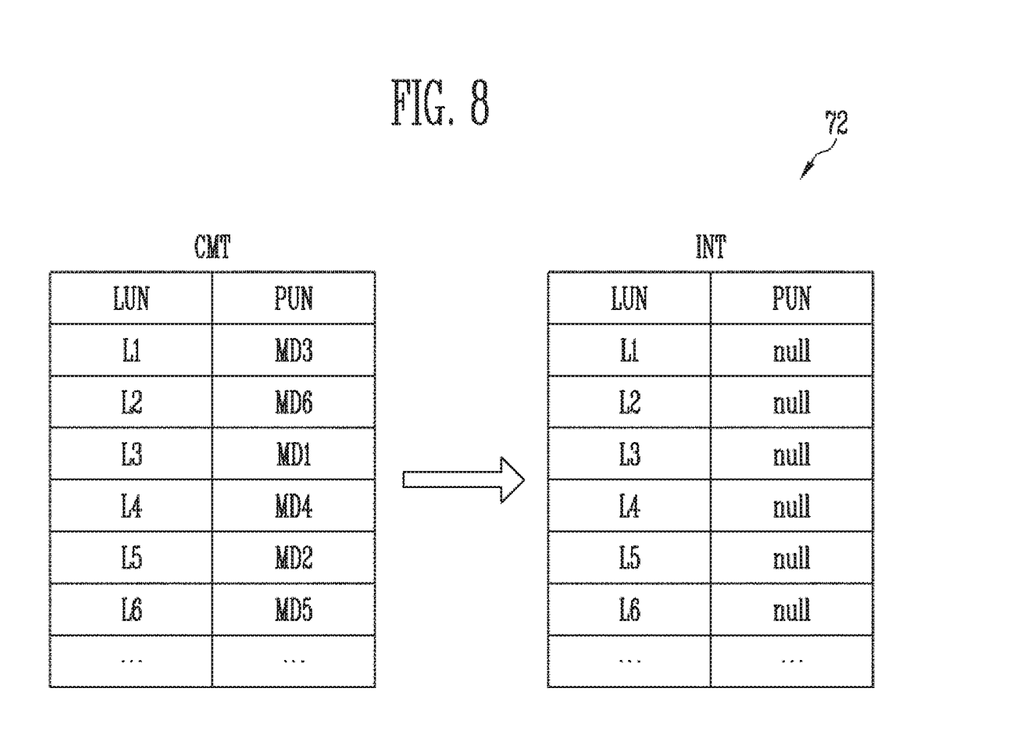
FIG. 8 is a diagram illustrating a map table initialized in a format operation according to an embodiment of the present disclosure.

FIG. 8 is a diagram illustrating a map table initialized in a format operation according to an embodiment of the present disclosure.

Referring to FIG. 8, an example of the current map table CMT and an example of the initial map table INT are illustrated. The current map table CMT may store mapping information in which logical unit numbers (LUN) are mapped to respective physical unit numbers (PUN). Although first to sixth logical unit numbers L1 to L6 are mapped to respective physical unit numbers MD1 to MD6, the number of the logical unit does not necessarily match the number of the physical unit to which that logical unit is mapped. For example, the first logical unit number L1 may be mapped to a third physical unit number MD3, and the second logical unit number L2 may be mapped to a sixth physical unit number MD6. When the current map table CMT is initialized, as shown in the initial map table INT, all the physical unit numbers (PUN) mapped to the first to sixth logical unit numbers L1 to L6 are initialized to null.

As described above, the map table 72 is initialized in the format operation, so that the format operation time of the memory system 1000 may be reduced. Further, since the unmap operation is omitted, an operation of re-writing address mapping information in the storage device 1100 is omitted, and thus the erase and write operation number (i.e., EW cycling number) of the storage device 1100 is not increased. Accordingly, the lifespan of the storage device 1100 may be increased.

Figure 9:
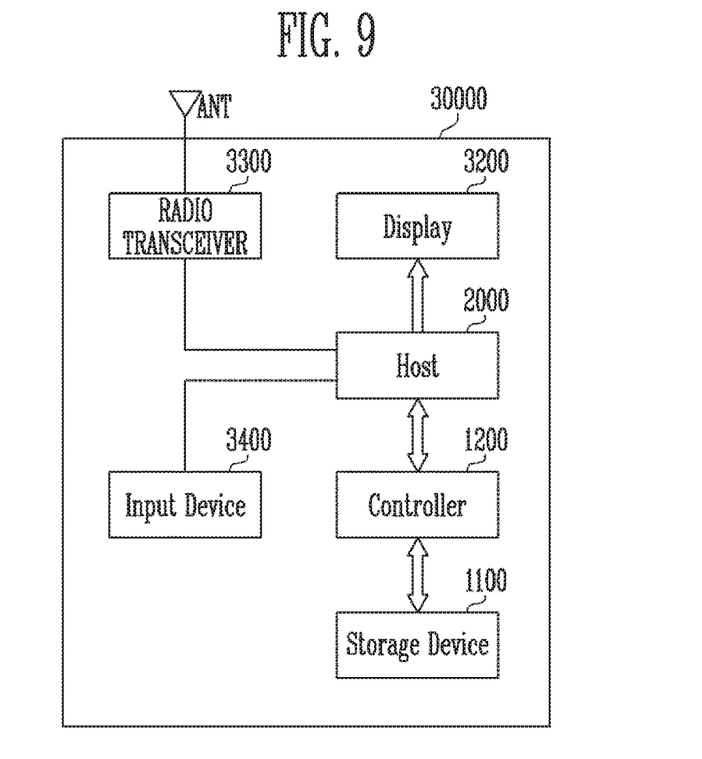
FIG. 9 is a diagram illustrating a memory system according to an embodiment of the present disclosure.

FIG. 9 is a diagram illustrating another embodiment of the memory system shown in FIG. 1.

Referring to FIG. 9, the memory system 30000 may be implemented as a cellular phone, a smart phone, a tablet PC, a personal digital assistant (PDA), or a wireless communication device.

The memory system 30000 may include a storage device 1100, a controller 1200 capable of controlling an operation of the storage device 1100, and a host 2000 capable of controlling the controller 1200. The controller 1200 may control a data access operation of the storage device 1100, e.g., a program operation, an erase operation, a read operation, or the like under the control of the host 2000.

Data programmed in the storage device 1100 may be output through a display 3200 under the control of the controller 1200.

A radio transceiver 3300 may transmit and receive radio signals through an antenna ANT. For example, the radio transceiver 3300 may convert a radio signal received through the antenna ANT into a signal that can be processed by the host 2000. Therefore, the host 2000 may process a signal output from the radio transceiver 3300 and transmit the processed signal to the controller 1200 or the display 3200. The controller 1200 may transmit the signal processed by the host 2000 to the storage device 1100. Also, the radio transceiver 3300 may convert a signal output from the host 2000 into a radio signal, and output the changed radio signal to an external device through the antenna ANT. An input device 3400 is a device capable of inputting a control signal for controlling an operation of the host 2000 or data to be processed by the host 2000, and may be implemented as a pointing device such as a touch pad or a computer mouse, a keypad, or a keyboard. The host 2000 may control an operation of the display 3200 such that data output from the controller 1200, data output from the radio transceiver 3300, or data output from the input device 3400 may be output through the display 3200.

Figure 10:
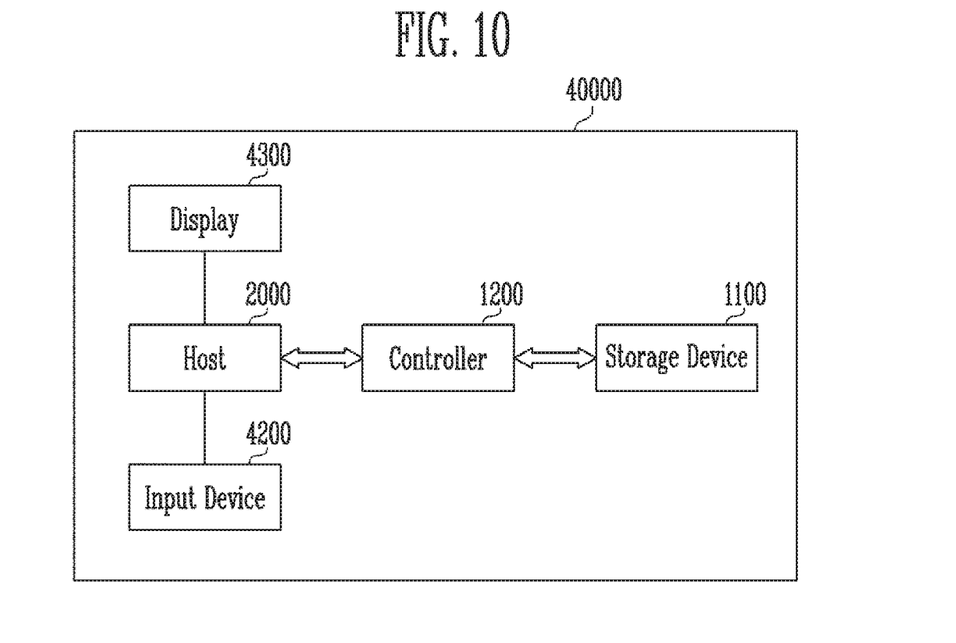
FIG. 10 is a diagram illustrating a memory system according to an embodiment of the present disclosure.

FIG. 10 is a diagram illustrating another embodiment of the memory system shown in FIG. 1.

Referring to FIG. 10, the memory system 40000 may be implemented as a personal computer (PC), a tablet PC, a net-book, an e-reader, a personal digital assistant (PDA), a portable multimedia player (PMP), an MP3 player, or an MP4 player.

The memory system 40000 may include a storage device 1100, a controller 1200 capable of controlling a data processing operation of the storage device 1100, and a host 2000 capable of controlling the controller 1200.

Also, the host 2000 may output data stored in the storage device 1100 through a display 4300 according to data input through an input device 4200. For example, the input device 4200 may be implemented as a pointing device such as a touch pad or a computer mouse, a keypad, or a keyboard.

The host 2000 may control overall operations of the memory system 40000, and control an operation of the controller 1200.

Figure 11:
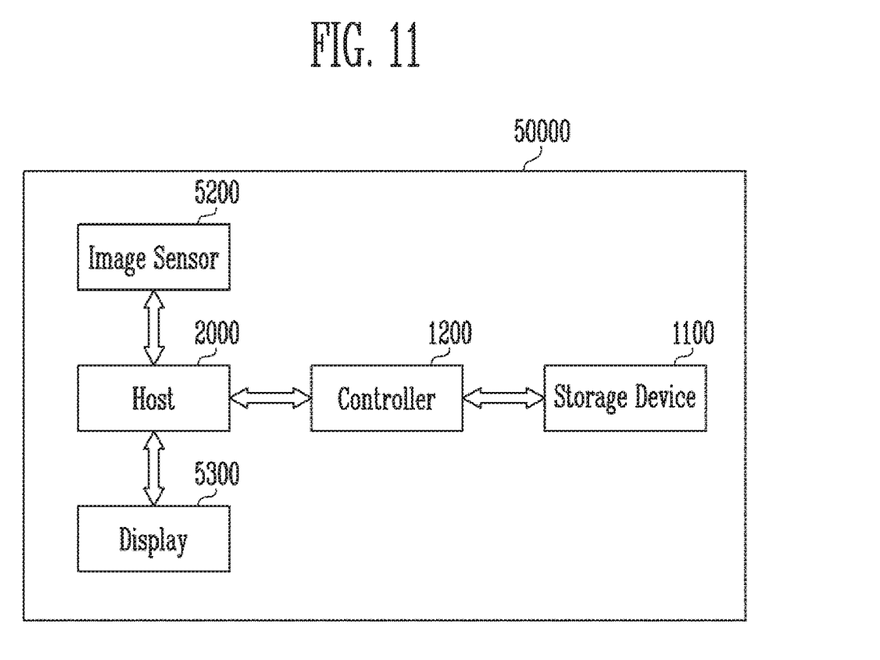
FIG. 11 is a diagram illustrating a memory system according to an embodiment of the present disclosure.

FIG. 11 is a diagram illustrating another embodiment of the memory system shown in FIG. 1.

Referring to FIG. 11, the memory system 50000 may be implemented as an image processing device, e.g., a digital camera, a mobile terminal having a digital camera attached thereto, a smart phone having a digital camera attached thereto, or a tablet PC having a digital camera attached thereto.

The memory system 50000 may include a storage device 1100, a controller 1200 capable of controlling a data processing operation of the storage device 1100, e.g., a program operation, an erase operation, or a read operation, and a host 2000 capable of controlling the controller 1200.

An image sensor 5200 of the memory system 50000 may convert an optical image into digital signals, and the digital signals may be transmitted to the host 2000. Under the control of the host 2000, the digital signals may be output through a display 5300, or be stored in the storage device 1100 through the controller 1200. In addition, data stored in the storage device 1100 may be output through the display 5300 under the control of the host 2000.

According to embodiments of the present disclosure, when an overall format operation of the memory system is performed, an update operation of a map table with respect to logical and physical addresses may be omitted. Thus, the time required to perform the format operation may be reduced, and an increase in cycling number increased by erase and write operations may be prevented.

Various embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art in light of the present disclosure that various changes in form and details may be made without departing from the spirit and scope of the present disclosure as set forth in the following claims.

What is claimed is:
1. A controller comprising:
a host interface configured to receive a format request from a host, and output an internal format request including initial logical unit information; and
a flash translation layer including:

a map table for storing mapping information between logical unit numbers and corresponding physical unit numbers, respectively; and a map control component configured to change, in response to the internal format request, the physical unit numbers to a predetermined value, wherein the initial logical unit information includes setting values of the logical unit numbers and the setting values are maintained from initially set values when the mapping information is changed.

2. The controller of claim 1, wherein the host interface includes:

a register configured to store the initial logical unit information; and a protocol component configured to, upon reception of the format request, generate the internal format request including the initial logical unit information from the register.

3. The controller of claim 1, wherein the map control component releases mapping relations between the logical unit numbers and the physical unit numbers of the map table.

4. A memory system comprising:

a storage device configured to store data; and a controller configured to control the storage device in response to a request of a host, wherein, in response to reception of a format request from the host, the controller initializes a map table storing mapping information between logical unit numbers and physical unit numbers using initially fixed values of the logical unit numbers, and controls the storage device to delete the data, wherein the initially fixed values of the logical unit numbers include information on power, a start address, and an end address of each logical unit number.

5. The memory system of claim 4, wherein the storage device includes:

a plurality of user blocks configured to store program data; and at least one meta block configured to store system data.

6. The memory system of claim 4, wherein the controller includes:

a host interface configured to receive the format request from the host, and output an internal format request including initial logical unit information including the initially fixed values; and the flash translation layer configured to initialize the map table according to the initial logical unit information.

7. The memory system of claim 6, wherein the flash translation layer outputs a format command to the storage device in response to the internal format request.

8. The memory system of claim 6, wherein the host interface includes:

a register configured to store the initial logical unit information; and a protocol component configured to, upon reception of the format request, generate the internal format request including the initial logical unit information from the register.

9. The memory system of claim 6, wherein the flash translation layer includes:

a map control component configured to, when the internal format request is received, output an initialization signal and a format command according to the initial logical unit information; and the map table configured to store the information on mapping between logical and physical unit numbers according to an operation of the memory system.

10. The memory system of claim 9, wherein the map control component releases mapping relations between the logical unit numbers and the physical unit numbers of the map table.

11. A memory system comprising:

a memory device including a region for storing system data; and a controller configured to control the memory device, wherein the controller includes:

a host interface configured to receive a format request from a host and to output an internal format request including logical unit information;

a map table for storing mapping information between logical addresses and physical addresses; and a flash translation layer configured to initialize the map table in response to the internal format request by changing the physical addresses of the map table to a predetermined value, wherein the internal format request includes setting values of the logical addresses, and wherein the setting values are maintained from initially set values when the mapping information is changed.

12. The memory system of claim 11, wherein the flash translation layer transmits a format command for deleting the mapping information including the system data to the memory device.

* * * * *